United States Patent
May-Weymann

(10) Patent No.: US 9,667,668 B2
(45) Date of Patent: May 30, 2017

(54) MANAGING SIM INDICATIONS

(71) Applicant: NVIDIA Corporation, Santa Clara, CA (US)

(72) Inventor: Alexander May-Weymann, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 68 days.

(21) Appl. No.: 13/858,552

(22) Filed: Apr. 8, 2013

(65) Prior Publication Data

US 2014/0105260 A1    Apr. 17, 2014

Related U.S. Application Data

(63) Continuation-in-part of application No. 13/653,593, filed on Oct. 17, 2012.

(51) Int. Cl.

| H04L 5/16 | (2006.01) |
| H04B 1/38 | (2015.01) |
| H04L 29/06 | (2006.01) |
| H04W 4/00 | (2009.01) |
| H04L 29/08 | (2006.01) |
| H04W 92/08 | (2009.01) |

(52) U.S. Cl.
CPC ........ H04L 65/1066 (2013.01); H04L 69/321 (2013.01); H04W 4/003 (2013.01); H04W 92/08 (2013.01)

(58) Field of Classification Search
None
See application file for complete search history.

(56) References Cited

U.S. PATENT DOCUMENTS

| 6,341,228 B1 * | 1/2002 | Hubbe ............. H04M 1/72544 |
| | | 455/558 |
| 6,978,157 B1 | 12/2005 | Amiens |
| 8,705,550 B2 | 4/2014 | Shah et al. |
| 2003/0129977 A1 * | 7/2003 | Dolwin ............... H04W 76/007 |
| | | 455/422.1 |
| 2005/0119978 A1 * | 6/2005 | Ates ............................... 705/67 |

(Continued)

FOREIGN PATENT DOCUMENTS

| CN | 1235494 A | 11/1999 |
| CN | 1399851 A | 2/2003 |
| CN | 1012833565 A | 10/2008 |

*Primary Examiner* — Wednel Cadeau
(74) *Attorney, Agent, or Firm* — Kevin Brown; Parker Justiss, P.C.

(57) ABSTRACT

One aspect provides a method of handling a proactive indication received from a subscriber identity module at a modem, the modem being connected to a terminal equipment via a command interface. The method comprises receiving, at a modem processor, the proactive indication from the subscriber identity module. The method further comprises determining that the indication is to be handled by the modem processor. The method further comprises a modem processor transmitting a display command via the command interface to the terminal equipment and the modem processor awaiting a user response command, and continuing or aborting an action indicated in the proactive indication depending on the user response in the user response command received from the terminal equipment.

16 Claims, 5 Drawing Sheets

(56) References Cited

U.S. PATENT DOCUMENTS

| | | | | |
|---|---|---|---|---|
| 2005/0277432 | A1* | 12/2005 | Viana | H04M 1/72525 |
| | | | | 455/466 |
| 2007/0207798 | A1* | 9/2007 | Talozi | G06F 11/3688 |
| | | | | 455/423 |
| 2008/0176548 | A1* | 7/2008 | Liang | H04W 52/0229 |
| | | | | 455/419 |
| 2010/0273513 | A1* | 10/2010 | Hsu | H04M 1/72552 |
| | | | | 455/466 |
| 2012/0020394 | A1 | 1/2012 | Shi et al. | |

* cited by examiner

MANAGING SIM INDICATIONS

CROSS-REFERENCE TO RELATED APPLICATION

This application is a continuation-in-part of U.S. application Ser. No. 13/653,593, filed by Alexander May-Weymann on Oct. 17, 2012, entitled "Method of Handling Proactive Software Toolkit Commands and 3GPP Modem Equipment Incorporating The Same," which is currently pending, commonly assigned with this application, and incorporated herein by reference.

TECHNICAL FIELD

This application relates to managing SIM (Subscriber Identity Module) indications. In particular the present disclosure relates to the handling of proactive indications where a modem communicates with a terminal equipment.

BACKGROUND

FIG. 1 is a schematic block diagram of communication systems comprising a terminal 2 equipment such as a host device and a modem 4. The host terminal 2 may be a user terminal, and may for example take the form of a desktop computer, laptop computer, tablet style computer, or mobile phone (which may be referred to as a "smart phone"). As shown in FIG. 1, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 1, the modem 4 is external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2).

The system also comprises a network 6 such as a mobile cellular network 6 (3GPP network or other CDMA network). Elements of the network 6 are well known to those skilled in the art and are not discussed herein.

For connecting to the mobile cellular network 6, the modem 4 comprises a first interface which comprises a wireless transceiver, typically in the form of a radio frequency (RF) transceiver and an antenna 5. The first interface of the modem 4 connects via an antenna (not shown) of the mobile cellular network 6 enabling the modem 4 to establish a channel between itself and the mobile cellular network 6.

This channel referred to above may be referred to as a "context". For example, if the mobile cellular network is a 3GPP network, then the connection between the modem 4 and a 3GPP network 6 may be called a PDP (Packet Data Protocol) context in 2G or 3G terminology, and an EPS (Evolved Packet System) bearer context in LTE (Long Term Evolution standards) terminology. The physical medium of the connection is typically a radio channel such as a 2G, 3G or LTE radio channel and the protocol that drives it may comprise a set of protocol layers as defined for example by 3GPP. The mobile cellular network 6 may be coupled to a further, packet-based network, preferably a wide area internetwork such as the Internet, by way of one or more gateway routers.

For connecting to the host processor 30 on the host terminal 2, the modem 4 comprises a second interface which could, for example, comprise a wired connection such as USB, or a short-range wireless transceiver such as an infrared connection or a radio frequency connection (e.g. Bluetooth).

In the terminology of the 3GPP (Third Generation Partnership Protocol), the host terminal 2 is referred to as terminal equipment (TE). The host processor is sometimes referred to as an application processor, and controls a user interface UI which interfaces with a user. The modem 4 has a processor which is referred to as a mobile termination (MT).

The modem 4 includes a subscriber identity module (SIM) 7. The SM 7 communicates with the modem processor via a UICC interface. A SIM application tool kit (STK) comprises a set of commands programmed into the SIM which enable the SIM to initiate actions from the SIM itself. The commands programmed into the SIM enable the SIM to initiate commands independently of the network and host processor.

A SIM initiates an action by generating a proactive STK indication to the modem processor.

In scenarios such as that illustrated in FIG. 1 where the modem is a separate device which needs to communicate with the host processor, a mechanism is needed to determine how to handle actions initiated by the SIM.

SUMMARY

One aspect provides a method of handling a proactive indication received from a subscriber identity module at a modem, the modem being connected to a terminal equipment via a command interface. The method comprises receiving, at a modem processor, the proactive indication from the subscriber identity module. The method further comprises determining that the indication is to be handled by the modem processor. The method further comprises a modem processor transmitting a display command via the command interface to the terminal equipment and the modem processor awaiting a user response command, and continuing or aborting an action indicated in the proactive indication depending on the user response in the user response command received from the terminal equipment.

Another aspect provides a method of handling commands received at a terminal equipment from a modem. The method comprises the terminal equipment receiving a display command at a command interface and displaying a notification to a user on a display at the terminal equipment based on the display command. The method further comprises the terminal equipment receiving a user input responsive to the notification and formulating a user response command based on the user input and the terminal equipment forwarding the user response command over the command interface to the modem.

Another aspect provides a modem comprising a modem processor and a command interface. The modem processor has a module interface configured to receive proactive indications from a subscriber identity module. The processor is configured to execute an indication handling procedure for handling indications received at the module interface. The command interface transmits commands from the modem processor to a terminal where the indication handling procedure, when executed, operates in response to receiving a proactive indication to generate a display command for transmission over the command interface. The command interface awaits a user command and continues or aborts an action indicated in the proactive indication depending on the user response.

Another aspect provides a terminal equipment comprising a host processor, a display, a user means for supplying a user indication to the host processor, and a command interface. The display is under control of the host processor. The command interface exchanges commands with a modem. The host processor is configured to: execute a command handling procedure which, when executed, operates to detect receipt of a display command over the command interface; cause the display to display a notification; to formulate a user response command based on the user input; and to transmit the user response command over the command interface to the modem.

Another aspect provides a method of setting up a modem to handle proactive indications received from a subscriber identity module at the modem where the modem is connected to a terminal equipment via a command interface. The method comprises the terminal equipment supplying to the profile data identifying a class of proactive indications to be handled at the modem but for which the terminal equipment is capable of provide feedback.

Another aspect is a wireless device comprising a modem processor, a host processor, a display, a user input means, and a command interface. The modem processor has a module interface configured to receive proactive indications from a subscriber identity module. The modem processor is configured to execute an indication handling procedure for handling indications received at the module interface. The display is under control of the host processor. The user input means supplies a user indication to the host processor. The command interface transmits commands from the modem processor to the host processor. The indication handling procedure, when executed, operates in response to: receive a proactive indication to generate a display command for transmission over the command interface; await a user response command, and continue or abort an action indicated in the proactive indication depending on the user response. The host processor is configured to execute a command handling procedure which, when executed, operates to: detect receipt of the display command over the command interface; cause the display to display a notification; detect a user input responsive to the notification displayed on the display; formulate a user response command based on the user input and; transmit the user response command over the command interface to the processor.

BRIEF DESCRIPTION

Reference is now made to the following descriptions taken in conjunction with the accompanying drawings, in which.

DETAILED DESCRIPTION

Figure 1:
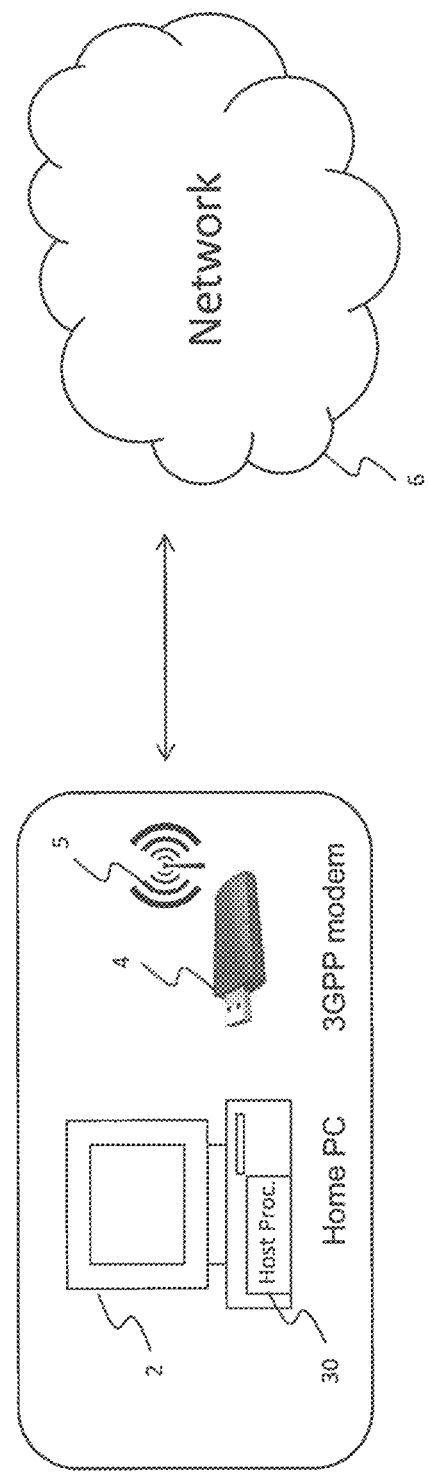
FIG. 1 is a schematic block diagram of a modem/host context.

According to the present disclosure, there is provided a method of handling a proactive indication received from a subscriber identity module at a modem, the modem being connected to a terminal equipment via a command interface, the method comprising: receiving at a modem processor the proactive indication from the subscriber identity module; determining that the indication is to be handled by the modem processor; the modem processor transmitting a display command via the command interface to the terminal equipment; the modem processor awaiting a user response command, and continuing or aborting an action indicated in the proactive indication depending on the user response in the user response command received from the terminal equipment.

In order to conform with the Third Generation Partnership Protocol, the display command and the user response command can be formulated as AT (attention)-commands specified by the Third Generation Partnership Protocol format.

Methods of the following described embodiments allow for the possibility of proactive indications generated by the subscriber identity module to be informed to the terminal equipment and for the terminal equipment to provide feedback. The current 3GPP Standard assumes the scenario where the processor which receives the indication from the subscriber identity module also controls a user interface and the display, and so is capable of informing a user about what is going on in a confirmation phase of a proactive indication. The SET UP CALL command discussed in ETSA TS 102.223 (chapter 6.4.13) is one such example. The same issue of possible user interaction also occurs for the proactive commands SEND DTMF and OPEN CHANNEL. Embodiments described herein allow these proactive indications from the subscriber identity module to be effectively handled in the context where a modem handles the indication, and is separate from the terminal equipment where the display and user interface are located.

In another aspect, the disclosure provides a modem comprising: a modem processor having a module interface configured to receive proactive indications from a subscriber identity module, the processor configured to execute an indication handling procedure for handling indications received at the module interface; a command interface for transmitting commands from the modem processor to a terminal, wherein the indication handling procedure when executed operates in response to receiving a proactive indication to generate a display command for transmission over the command interface, to await a user response command, and to continue or abort an action indicated in the proactive indication depending on the user response.

The modem can comprise a casing which houses the modem processor and where the command interface is operable to transmit commands over an external communication structure from the casing. Embodiments are also useful in the context of a mobile phone which has in a single casing an application processor and a modem processor.

Another aspect of the disclosure provides a wireless device comprising: a modem processor having a module interface configured to receive proactive indications from a subscriber identity module, the processor configured to execute an indication handling procedure for handling indications received at the module interface; a host processor and a display under the control of the host processor; user input means for supplying a user indication to the host processor; and a command interface for transmitting commands from the modem processor to the host processor, wherein the indication handling procedure when executed operates in response to receiving a proactive indication to generate a display command for transmission over the command interface, to await a user response command, and to continue or abort an action indicated in the proactive indication depending on the user response; and wherein the host processor is configured to execute a command handling procedure which, when executed, operates to detect receipt of the display command over the command interface, to cause the display to display a notification, to detect a user input responsive to the notification displayed on the display, to formulate a user response command based on the user input and transmit the user response command over the command interface to the processor.

The disclosure also provides in a further aspect a terminal equipment comprising: a host processor; a display under the control of the host processor; user input means for supplying a user indication to the host processor; a command interface for exchanging commands with a modem, wherein the host processor is configured to execute a command handling procedure which, when executed, operates to detect receipt of a display command over the command interface, to cause the display to display a notification, to detect a user input responsive to the notification displayed on the display, to formulate a user response command based on the user input and to transmit the user response command over the command interface to the modem.

The terminal equipment can comprise a casing which houses at least the host processor and wherein the command interface is operable to exchange commands with a modem over a communication structure external of the casing.

The disclosure provides in a further aspect a method of handling commands received at a terminal equipment from a modem, the method comprising: the terminal equipment receiving a display command at a command interface and displaying a notification to a user on a display at the terminal equipment based on the display command; the terminal equipment receiving a user input responsive to the notification and formulating a user response command based on the user input; and the terminal equipment forwarding the user response command over the command interface to the modem.

The disclosure provides in a further aspect a method of setting up a modem to handle proactive indications received from a subscriber identity module at the modem, the modem being connected to a terminal equipment via a command interface, the method comprising: the terminal equipment supplying to the profile data identifying a class of proactive indications to be handled at the modem but for which the terminal equipment is capable of providing feedback.

After transmitting the display command, the modem processor can decode the proactive indication and determine whether a subsequent modify and display command is to be transmitted, before awaiting the user response command.

If no user response command is received within a predetermined time, the modem can be configured to proceed with an action indicated in the proactive indication as a default measure.

Figure 2:
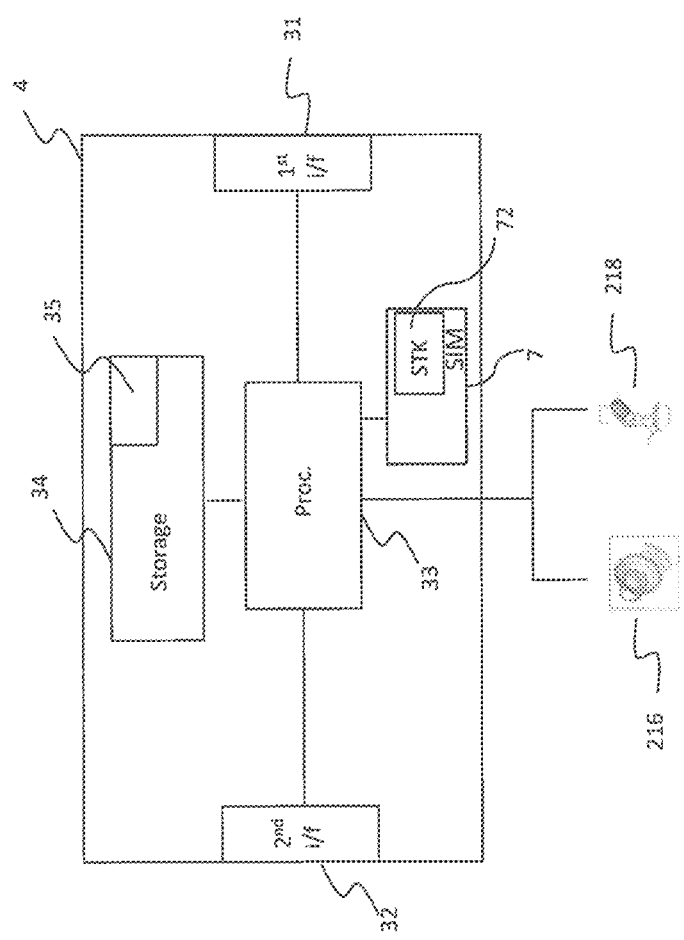
FIG. 2 is a schematic block diagram of a modem.

The terminal equipment can be configured to display a notification to a user responsive to the display command, said notification requiring a user response. The terminal equipment can formulate the user response command based on a user response entered by a user in response to the displayed notification. The user response can be of different types, wherein the user response command identifies the type of user response. If appropriate, all user responses of a negative type can be decoded at the modem and supplied to the subscriber identity module as a single negative response code. Referring to FIG. 2, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33, so as when executed to send and receive packets between the host 2 and network 6, and to perform the additional operations of the modem 4 as discussed below. However, the possibility of some or all of the modem functionality being implemented in dedicated hardware is not excluded.

The modem 4 comprises a first interface 31 corresponding to the first interface referred to above with reference to FIG. 1. The modem 4 also comprises a second interface 32 corresponding to the second interface referred to above with reference to FIG. 1. The modem may be configured in a similar manner to that discussed in relation to FIG. 1 above, but with additional functionality added in accordance with the present disclosure, an example of which will be discussed in more detail below.

As shown in FIG. 2 the modem 4 has direct access to interface with a speaker 216 for outputting audio data and a microphone 218 for receiving audio data.

The modem 4 includes a subscriber identity module (SIM) 7 which is an insertable module into the modem and which communicates with the modem to identify uniquely an authorized user of a device in which the modem is incorporated. Alternative embodiments include a μ SIM card or UICC in lieu of the SIM card 7. The SIM 7 includes a SIM application tool kit 72. The STK 72 comprises a set of commands programmed into the SIM which define how the SIM interacts, and which can allow the SIM to initiate commands independently of the modem and network. Examples of such commands are indicated below, but they are referred to here generally as "Proactive STK Indications." When the SIM generates a proactive indication, it has to be handled properly by the modem or the host processor 30.

An AT-command is defined by the 3GPP transport specification (TS) and is abbreviated from ATtention command. It starts the command line of any command which is to be sent from a terminal equipment TE (for example, the host computer) to a terminal adaptor TA, for example, the modem. AT-commands are provided for a variety of scenarios for communication over the interface between a TE and a TA. The 3GPP TS 27.007 Release 10 defines AT-commands for handling proactive STK indications, in the format AT+CUSAT . . . . For proactive indications which need to be handled by the terminal equipment, an AT-command exists of the format AT+CUSATP:<proactive<CND> which allows the proactive command to be forwarded transparently from the modem to the host processor, and a response to be forwarded transparently back to the SIM. The current 3GPP specifications do not provide commands for several use cases where the modem handles the procedure. Embodiments described below provide appropriate commands for various use cases.

An architectural environment which allows for the handling of AT-commands which deal with these proactive indications is described below.

Figure 3:
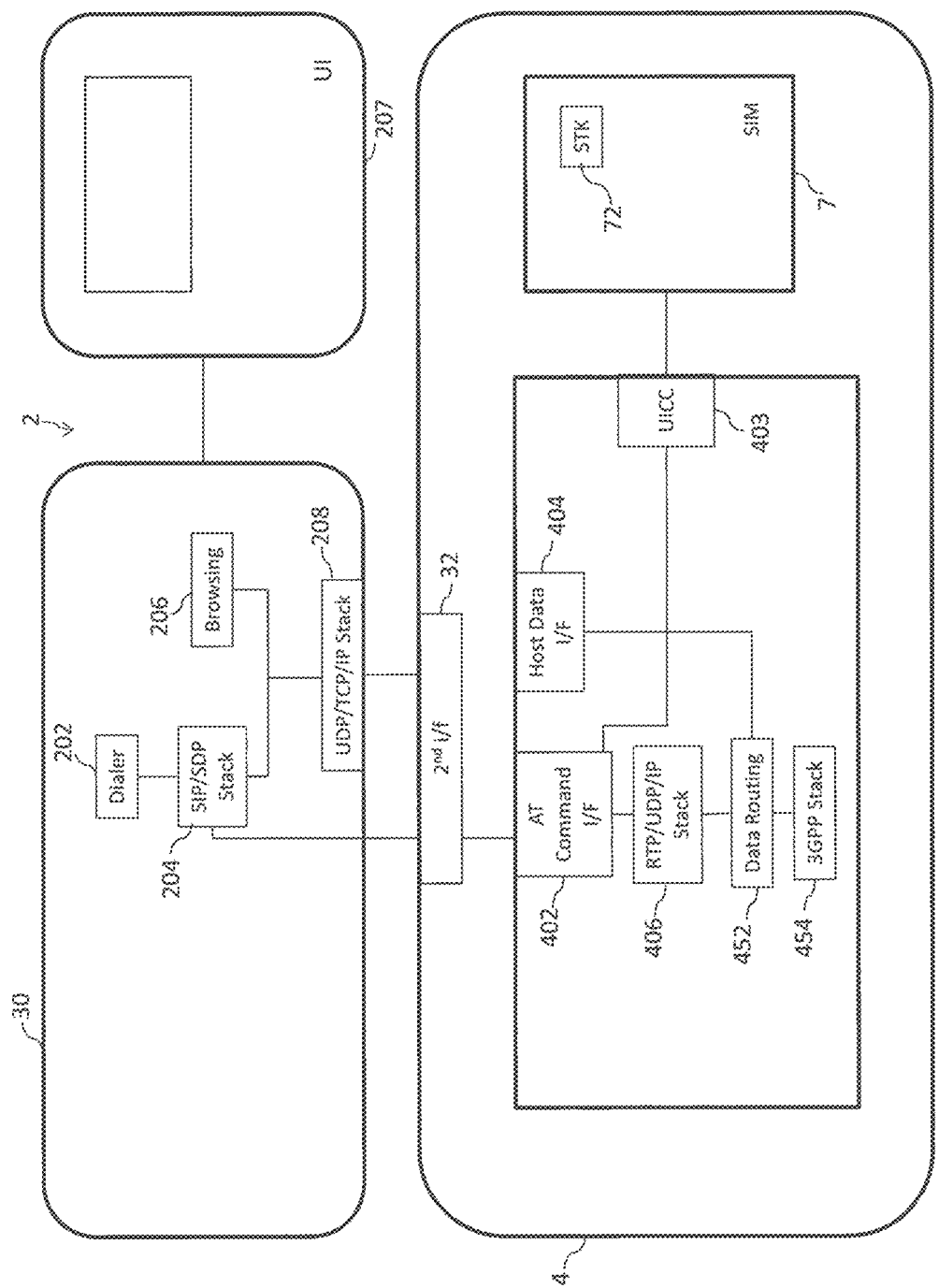
FIG. 3 is a schematic block diagram showing functional blocks within the modem and host.

FIG. 3 is described to show an architectural context for implementing embodiments of the invention, and illustrates a host processor 30 and the modem 4.

As in the known architecture for a user equipment (host terminal (TE) 2 and modem 4) the host processor 30 is operatively coupled to a non-transitory computer-readable storage medium (not shown) such as a magnetic or electronic memory storing one or more application programs. The application programs comprise code arranged to be executed on the host processor 30. The application programs include a phone dialer program 202, comprising code which when executed on the host processor 30 enables the host processor 30 to establish a call to at least one further terminal connected to the network 6. The application programs may also include other programs for example the browser program, email program, instant message program and file transfer program shown collectively as block 206. The TE 2 includes a UI 207 which is controlled by the host processor 30 and which allows a user to interact with the host/modem activity. The UI can include a display 209 and input means (such as a keypad or touch screen) for accepting a user response.

The host processor 30 comprises a SIP/SDP stack 204, and UDP/TCP/IP stack 208 configured to process data received from the phone dialer program 202 for communication to and from the network 6 according to Internet protocols to establish a call to at least one further terminal connected to the network 6.

At the host processor 30, the SIP/SDP/TCP/IP protocols are configured to process data received from the phone dialer program 202 for communication to and from the network 6 according to Internet protocols to establish a call to at least one further terminal connected to the network 6. SIP leverages SDP to establish streaming parameters for the session so that all the devices can participate (that includes, for example, negotiation of codecs used to encode media so all the participants will be able to decode it, and negotiation of the transport protocol used).

Once call establishment is complete, streaming parameters from the SIP/SDP negotiation are supplied from the host processor 30 via the second interface 32 to the modem 4. The streaming parameters may be supplied to the modem 4 in the form of an AT (ATtention) command. The modem processor 33 includes an AT command interface 402 for receiving AT commands from the host processor 30 on the host terminal 2. The AT command interface 402 may take the form of an application program interface (API). The AT commands received over the AT command interface 402 are used to control the operation for the modem 4 as described in more detail below. The AT-command interface also allows for the transfer of AT-commands from the modem 4 to the host processor 30 so that they can be handled by the TE 2, as described more fully herein.

The parameters provided to the modem 4 resulting from SIP/SDP negotiation further include a RTP Synchronization Source (SSRC) identifier (a randomly chosen number which identifies the source of the data stream). The SSRC identifier may be used by the data routing block 452 to route downlink data packets received from the network 6 in addition to source/destination IP addresses and source/destination ports. For uplink transmissions to the network 6, the SSRC identifier is an input for a RTP/UDP/IP stack 406 to build the RTP header. That is, the SSRC identifier is included in the RTP header of an IP packet transmitted to the network 6 following processing at block 406.

Alternatively, the SIM 7 can proactively attempt to establish a call using a SET UP CALL proactive indication. In that case, the AT-command interface conveys different commands to allow a user to intervene, as discussed later.

By the way of general background, but not illustrated, the modem 4 comprises an audio interface arranged to couple the modem 4 to a speaker 216 and a microphone 218. Once a call has been established by the phone dialer program or SIM, input voice data received by microphone is transmitted, via the audio interface, to the modem processor 33.

The RTP, UDP, and IP processing 406 is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as to process the encoded audio data for communication to and from the network 6 according to Internet protocols. However, the possibility of some or all of the functionality of the code 35 being implemented in dedicated hardware is not excluded.

The 3GPP stack 454 is configured to process the encoded audio data for communication to and from a mobile cellular network 6 (3GPP network or other CDMA network), the 3GPP stack 454 comprising a set of protocol layers as defined for example by 3GPP for transferring data across a radio channel such as a 2G, 3G or LTE radio channel. As is well known, the protocol stack according to 3GPP comprises a plurality of layers, beginning at the lowest layer is the physical layer PHY which represents the signaling link, then a medium access control (MAC) protocol layer, then a radio link control (RLC) protocol layer and then a packet data convergence protocol (PDCP) layer. The 3GPP protocol stack 454 also includes a number of other higher layers, not discussed herein. The 3GPP protocol stack 454 is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as when executed to perform the operations described above.

As already discussed in 3GPP TS 27.007 Release 10, AT-commands are defined for handling proactive STK indications. That is, commands are specified for conveying actions initiated by the subscriber identity module (SIM) from the modem to the terminal equipment (TE). However, some proactive STK indications are handled by the modem itself. When using AT-commands for handling STK indications, it is needed to decide which entity should handle the proactive STK indication. There are two possibilities: the modem (MT) or the host processor (application/user) (TE). As described more fully in the following, if the terminal equipment 2 handles the indication, the proactive STK command (the AT-command incorporating the STK indication) is forwarded transparently via the MT and the responses forwarded transparently back to the SIM. However, if the MT handles the procedures, problems can arise where it is desired to let the user have the possibility to intervene in the execution of a proactive STK command.

Embodiments of the present disclosure address these matters.

When the STK 72 on the SIM 7 determines to initiate an action, it generates a proactive STK indication to the modem. When the modem recognizes it as an indication it will handle, it formulates a novel "unsolicited indication" AT-command. For certain indications where the modem can handle the indication, it is desirable if the user also has the possibility to interrupt the execution of the proactive STK procedure as well. There is currently no officially 3GPP defined indication and procedure for actions that are handled internally by the modem but where the user has the possibility to stop execution. The 3GPP Standard assumes a scenario where the processor which handles the indication from the SIM also controls the UI and display. One specific example is a SET UP CALL command triggered by the SIM with an "alphaID" informing the user about what is going on in the confirmation phase. The alpha ID is a control element encoded in the indication which can control what is displayed. Such commands with "alpha IDs" are discussed in ETSA TS 102.223 (chapter 6.4.13), where it is specified that if the user does not accept the call or rejects the call, the operation is aborted. The same issue of possible user interaction occurs for the proactive commands SEND DTMF and OPEN CHANNEL. That is, the user should have the possibility to interrupt the execution of these commands.

It will be appreciated that in the case for example of a setup call command being initiated by the STK 72, this would be in place of a call being initiated by a user, for example, at the dialer 202. Nevertheless, the fact that the STK has setup a call needs to be made available to a user at the UI 207 of the host TE 2. In fact, not only is it needed to indicate that the modem has handled the STK procedure (that is, in the case of SET UP CALL that the modem has unilaterally attempted to set up a call with a network), but it is also needed to provide the possibility for a user to allow or reject the proactive command. The indication that the modem has handled an STK procedure can be made over the AT-command port 402. In addition, embodiments of the present disclosure introduce a first new AT-command "unsolicited indication", which can include an "alpha ID". This is achieved by displaying the complete coded proactive command. Then, the TE can receive and decode the unsolicited indication, adapt the display accordingly and provide the possibility for a user to accept or reject the action. The TE analyzes the unsolicited indication and determines if it is for SET UP CALL and a "alphaID" needs to be displayed. It will then display on the screen what is encoded in the "alphaID" and provide two buttons for the user: OK/ABORT. The response from the user is then forwarded using a second new AT-command back to the modem (over the AT-command interface) and then the modem continues or aborts the procedure at the modem, based on the user response.

The second AT-command for the response can allow additional information to distinguish different use cases like "user did not respond" or "user rejected". Alternatively, a negative response could be encoded as a TERMINAL RESPONSE command and be transparently forwarded by the modem processor to the SIM 7 (to simplify handling in the modem processor for possible different reject causes.

The TE 2 can configure the modem for which of the proactive indications (that are handled by the modem) it is capable of handling a confirmation/user response. The TE 2 may not be interested in all of them or it could be incapable of interpreting information. For example, in the case of the three proactive commands exemplified here, the UI 207 of the TE 2 could provide only a user possibility for aborting a SET UP CALL, but not for a SEND DTMF or an OPEN CHANNEL command.

To accommodate this, a further novel command is provided to register a profile of the nature of STK commands that shall be handled by the modem but for which an indication shall be given to the TE and for which the TE is capable of providing feedback (allow/reject proactive command). In cases where a proactive command needs user confirmation (according to the 3GPP Standard), but the TE 2 has indicated that it does not support the ability for a user confirmation, a default position is that the modem can continue processing the command, assuming a positive user confirmation.

Figure 4:
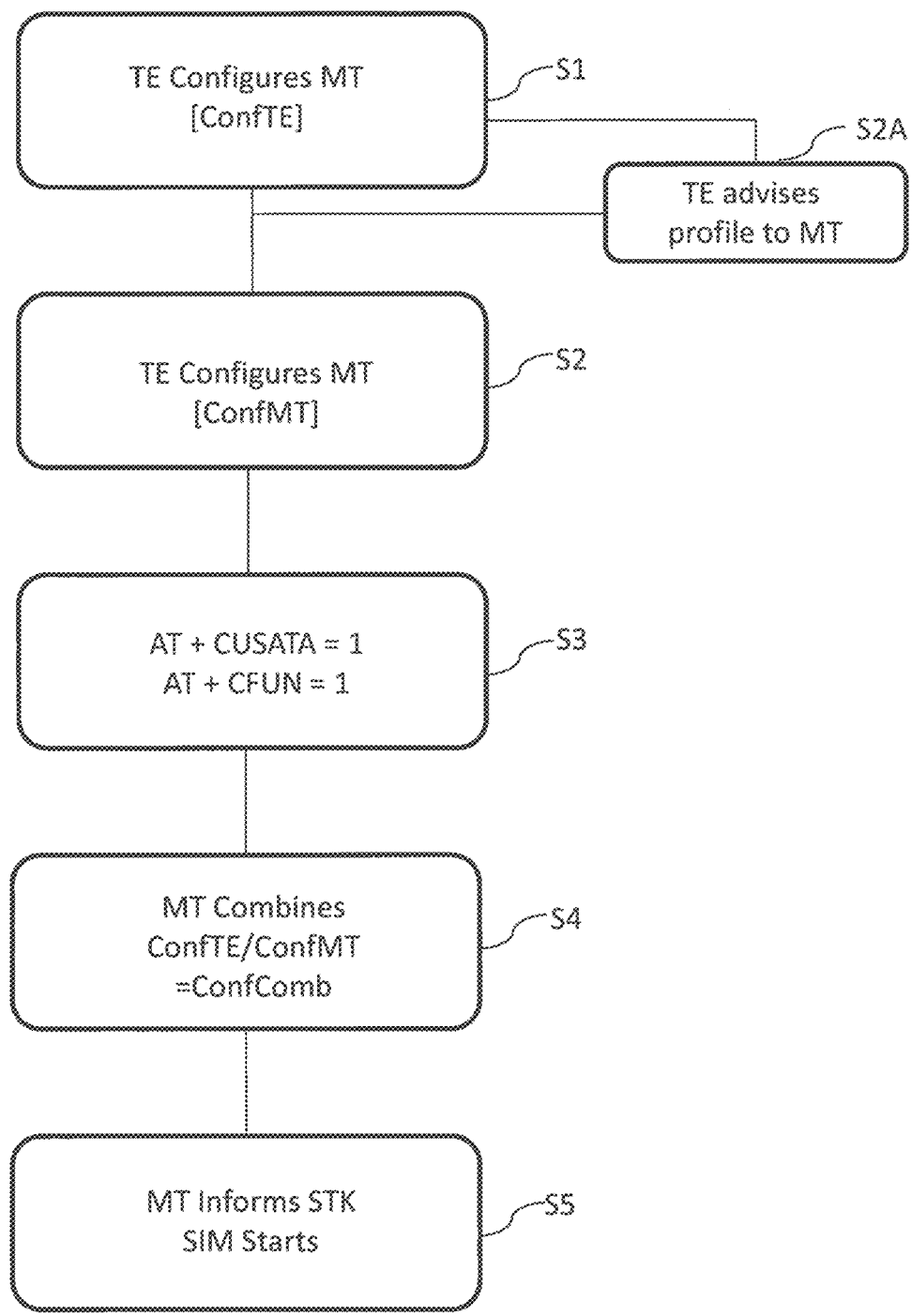
FIG. 4 is a flow chart showing a configuration procedure.

FIG. 4 is a flow chart illustrating the operation on start-up. At step S1, the TE configures the MT about the STK actions TE can perform using an existing AT-command AT+CUSATW (→confTE). At step S2, the TE configures the MT about the STK actions that the MT shall perform using the command AT+CUSATW (→confMT). An additional step S2A can be included where the TE configures the MT about which of the MT actions it can provide feedback for.

At step S3, a command is returned from the TE (AT+CUSATA=1) indicating that the TE is ready to handle indications. A subsequent command AT+CFUN=1 causes the SIM to start up. At step S4, the MT combines confTE and confMT to give a combination confCOMB which indicates a combined set of actions that the TE and MT jointly can support. At step S5, the MT informs the SIM/STK 72 about what can be handled using this combination. Thus, the SIM/STK 72 does not know which of the possible STK actions will be handled by the TE and which ones by the MT. Left in this state, the STK applet on the SIM 7 starts working.

Figure 5:
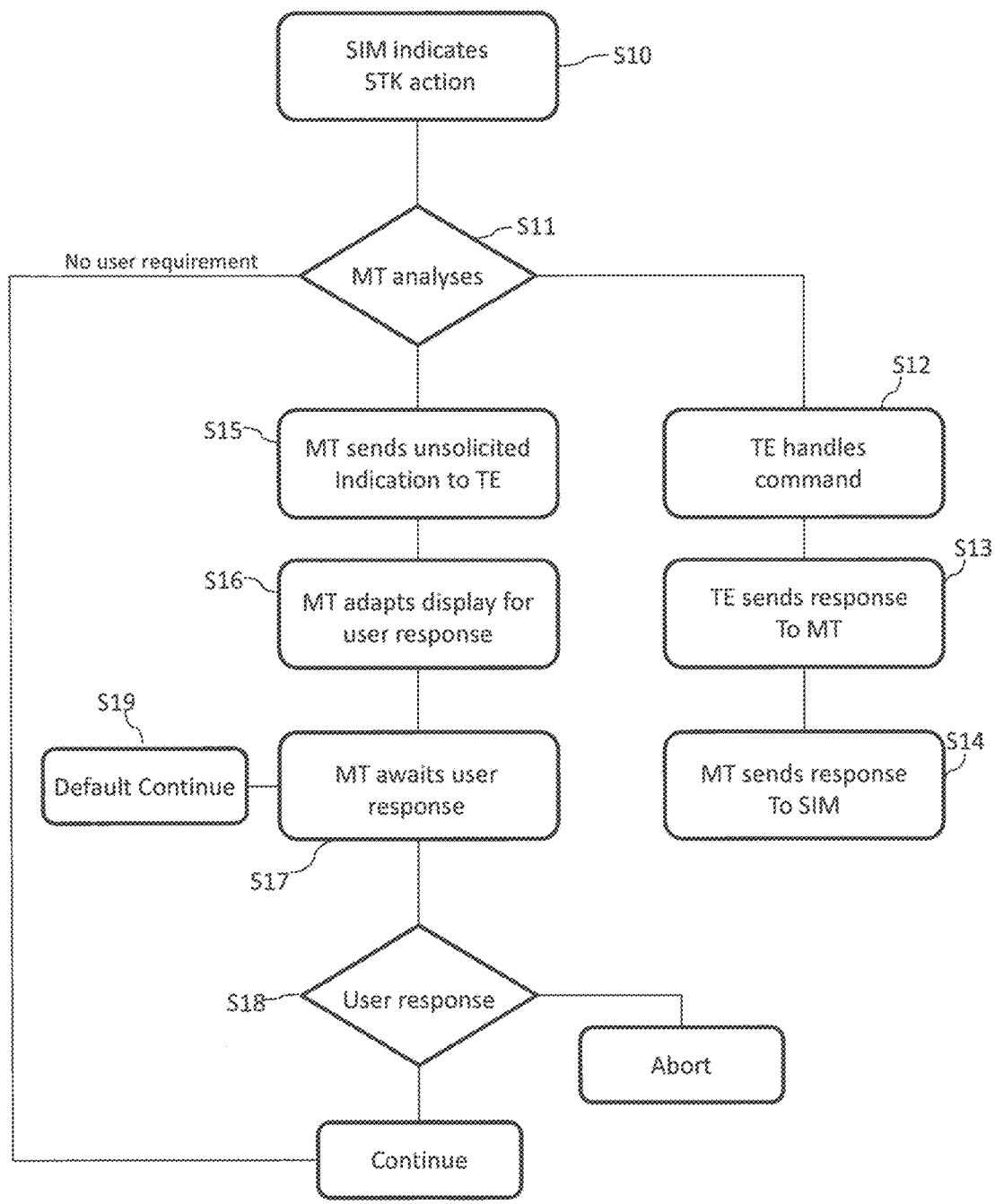
FIG. 5 is a flow chart showing an indication handling procedure.

FIG. 5 is a flow chart illustrating the handling of an STK action. At step S10, the SIM 7 indicates a pending STK action to the MT 33 by sending a proactive indication over the MT/UICC interface 403. At step S11, the MT 33 reads the action, analyzes it and decides if it is something to be handled by the TE or the MT (based on the confTE and confMT). There are two possibilities where the MT handles it: one where no user intervention is expected, and one where user intervention/information is required. Where it is determined that the TE is to handle the command, it indicates the coded STK command as received by the SIM by sending an AT-command+CUSATP over the AT-command interface 402. The TE decodes the indication and takes all the actions that are needed to handle the command, as indicated at step S12. On completion, the TE sends back a coded response using AT+CUSATT and at step S14, the MT 33 forwards the coded response to the SIM 7. The coded response from the TE is sent to the MT over the AT-command interface 402. The coded response is forwarded from the MT to the SIM over the UICC interface 403.

If the MT is to handle the command without user intervention/information the procedure continues.

If at the analysis step S11, it is determined that the MT 33 is handling the indication, but a user confirmation is needed or it is something that the TE/user should be interested in as well, an "unsolicited indication" AT-command is sent S15 from the MT to the host 30 over the AT-command interface 402. This has the effect on the TE that it is displayed to a user on the UI 207. Then at step S16, the TE decodes the indication from the STK 72 and if necessary adapts the display and provides the possibility for the user to accept or reject the action. A response from the user is returned using the new AT-command over the AT-command interface 402 and the MT awaits the user response as step S17. Depending on the user response, the MT aborts or continues the procedure. If there is no user response, the MT defaults to continue the procedure (S19).

Those skilled in the art to which this application relates will appreciate that other and further additions, deletions, substitutions and modifications may be made to the described embodiments.

What is claimed is:

1. A method of handling a proactive indication received from a subscriber identity module at a modem, the modem being connected to a terminal equipment via a command interface, the method comprising:
   receiving at a modem processor the proactive indication from the subscriber identity module, wherein the modem processor is separate from the terminal equipment;
   determining whether the indication is to be handled by the modem processor or a host processor in the terminal equipment;

when the indication is to be handled by the modem processor, the modem processor transmitting a display command via the command interface to the terminal equipment; and when the indication is to be handled by the modem processor, the modem processor awaiting a user response command from the host processor in the terminal equipment, and continuing or aborting an action indicated in the proactive indication depending on the user response in the user response command received from the host processor in the terminal equipment.

2. A method according to claim 1, wherein after transmitting the display command the modem processor decodes the proactive indication and determines whether a subsequent modifying display command is to be transmitted before awaiting the user response command.

3. A method according to claim 1, wherein the display command and the user response command are formulated as AT-commands according to the Third Generation Partnership Protocol.

4. A method according to claim 1, wherein if no user response command is received within a predetermined time, the modem proceeds with an action indicated in the proactive indication.

5. A method according to claim 1, comprising the step of the terminal equipment displaying a notification to a user responsive to the display command, said notification requiring a user response.

6. A method according to claim 1, wherein the user response command indicates a type of user response.

7. A method according to claim 1, wherein the proactive indication causes one of the following actions:
SET UP CALL;
OPEN CHANNEL;
SEND DTMF.

8. A method according to claim 5, wherein the terminal equipment formulates the user response command based on a user response entered by a user in response to the displayed notification.

9. A method according to claim 6, wherein the modem processor decodes all response types indicating that the action should be aborted as a single response for the subscriber identity module.

10. A method of handling commands received at a terminal equipment from a modem, the method comprising:
determining, by a modem processor of the modem, whether a proactive indication received from a subscriber identity module at the modem is to be handled by the modem processor or a host processor in the terminal equipment;

when the indication is to be handled by the modem processor, the terminal equipment receiving a display command from the modem processor at a command interface and displaying a notification to a user on a display at the terminal equipment based on the display command;

when the indication is to be handled by the modem processor, the terminal equipment receiving a user input responsive to the notification and formulating a user response command based on the user input; and when the indication is to be handled by the modem processor, the terminal equipment forwarding the user response command over the command interface to the modem, wherein the modem processor is separate from the terminal equipment.

11. A method according to claim 10, wherein the user response command indicates a type of user response.

12. A modem comprising:
a modem processor having a module interface configured to receive proactive indications from a subscriber identity module at the modem, the modem processor configured to:
determine whether the indications are to be handled by the modem processor or a host processor in terminal equipment connected to and separate from the modem; and
when the indications are to be handled by the modem processor, execute an indication handling procedure for handling indications received at the module interface;
a command interface for transmitting commands from the modem processor to the host processor in the terminal equipment when the indications are to be handled by the modem processor, wherein the indication handling procedure when executed operates in response to receiving the proactive indications to generate a display command for transmission over the command interface to the host processor in the terminal equipment and awaits a user response command from the host processor, and the modem processor continues or aborts an action indicated in the proactive indication depending on the user response received from the host processor in the terminal equipment.

13. A modem according to claim 12, which comprises a casing housing the modem processor, wherein the command interface is configured to transmit commands from the modem processor over a communication structure external to the casing.

14. A terminal equipment comprising:
a host processor;
a display under the control of the host processor;
user input means for supplying a user indication to the host processor; and
a command interface for exchanging commands with a modem, wherein the host processor is configured to execute a command handling procedure which, when executed, operates to detect receipt of a display command over the command interface, to cause the display to display a notification, to detect a user input responsive to the notification displayed on the display, to formulate a user response command based on the user input and to transmit the user response command over the command interface to the modem, wherein:
a modem processor of the modem separate from the terminal equipment determines whether a proactive indication received from a subscriber identity module at the modem is to be handled by the modem processor or the host processor in the terminal equipment and, only when the indication is to be handled by the modem processor, the modem exchanges the commands with the host processor of the host processor of the terminal equipment.

15. A terminal equipment according to claim 14, comprising a casing housing at least the host processor wherein the command interface is operable to transmit commands to be exchanged with the modem over a communication structure external of the casing.

16. A method of setting up a modem to handle proactive indications received from a subscriber identity module at the modem, the modem being connected to and separate from a terminal equipment via a command interface, the method comprising:

the terminal equipment supplying profile data identifying a class of proactive indications to be handled at the modem but for which the terminal equipment is capable of providing feedback, wherein:

a modem processor of the modem determines whether a proactive indication received from a subscriber identity module at the modem is to be handled by the modem processor or a host processor in the terminal equipment and, only when the indication is to be handled by the modem processor, the terminal equipment provides the profile data.

* * * * *